UNITED STATES PATENT OFFICE.

CHARLES ROTTER, OF EAST BIRMINGHAM, PENNSYLVANIA.

IMPROVEMENT IN VARNISHES OR BRONZE COATINGS FOR ARTICLES OF PLASTER, IRON, WOOD, &c.

Specification forming part of Letters Patent No. 139,333, dated May 27, 1873; application filed May 5, 1873.

*To all whom it may concern:*

Be it known that I, CHARLES ROTTER, of East Birmingham, in the county of Allegheny and State of Pennsylvania, have invented a new and Improved Varnish, of which the following is a specification:

The object of my invention is to furnish a durable bronze varnish in different colors for coating and protecting plaster of Paris, terra cotta, stucco, wood and iron ornaments, and busts, which may be placed outside, exposed to the weather, or inside, to be cleaned by the use of water, as occasion requires. The brilliant hue and the protecting qualities of this varnish make it specially useful for busts and plaster ornaments. My invention consists in the mixture of "mica silver" and "aurosit" with collodion, in connection with aniline and other colors to produce different tints.

By mixing one-half ounce of mica silver (argentine mica) with three ounces of clear collodion, and shaking it thoroughly, a brilliant silver varnish is obtained, which may be colored to any desired shade or tint by the addition of aniline colors. These aniline varnishes are more suitable for inside purposes, as they are too quickly changed by the influence of the sun and rain.

By the mixture of half an ounce of aurosit (*aurum musinum*) or dento-sulphuret of tin with three ounces of clear collodion, a beautiful gold-bronze varnish is obtained, which may be produced still brighter by the addition of aniline yellow or curcumine dissolved in alcohol.

Previous to using these bronze varnishes they have to be thoroughly shaken to mix the settled powder with the collodion, then the necessary quantity is taken out and transferred with a soft brush to the objects to be covered. Two coats will suffice in most cases. Three may be used when the objects are more exposed.

A brilliant glossy surface and neat attractive appearance is given by these varnishes to the coated objects, so that with but small expense variegated and useful effects are produced.

Having thus described my invention, I claim as new and desire to secure by Letters Patent—

The bronze varnish obtained by combining mica silver or aurosit with collodion in the proportion described, in connection with the different colors of aniline, substantially as and for the purpose described.

CHARLES ROTTER.

Witnesses:
SAMUEL AMMON,
JACOB MINEHART.